UNITED STATES PATENT OFFICE.

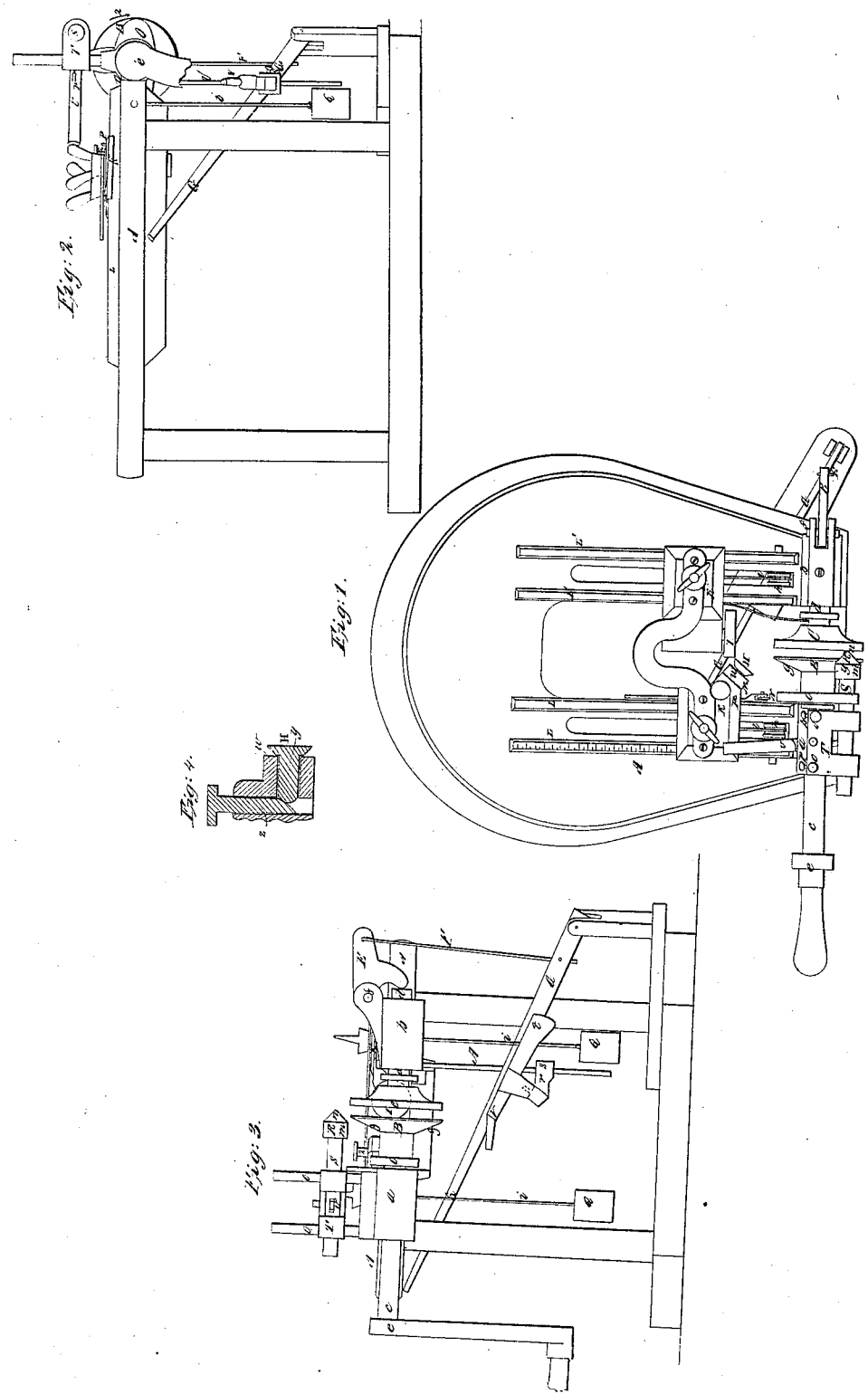

JOSEPH F. FLANDERS, OF NEWBURYPORT, MASSACHUSETTS.

MACHINERY FOR CUTTING AND BINDING SHEET METAL.

Specification of Letters Patent No. 7,836, dated December 17, 1850.

*To all whom it may concern:*

Be it known that I, JOSEPH F. FLANDERS, of Newburyport, in the county of Essex and State of Massachusetts, have invented an Improved Machine for manufacturing a circular, elliptical, or a regular or irregular curved formed piece or plate from a sheet of tin, or other material, also for cutting a circular or other proper shaped aperture in a plate of tin or other material, also for bending or turning down the edge of such circular plate of tin after or during the formation thereof; and I do hereby declare that the same is fully described and represented in the following specification and accompanying drawings, letters, figures, and references thereof.

Of the said drawings Figure 1 denotes a top view of my improved machine. Fig. 2 is a side elevation, and Fig. 3 is an elevation of the front end of it.

In the said drawings A, represents the supporting frame of the machine, which is made in the form as therein seen, and with boxes are bearings $a$, $b$, at its front ends for respectively supporting the shafts $c$, $d$, of the circular holders or gripping plates B, C. The shaft of each holder B, C, is made to rotate freely in a transverse direction in its bearing. To the outer end of the shaft $c$, a crank $e$, or other proper contrivance for rotating it is applied, while to the outer end of the other shaft, ($d$) a suitable mechanism is applied in such manner as to enable a person to force or press the shaft, and the holder plate C, toward the holder plate B, such pressure contrivance being so constructed as at the same time to allow of the free rotation of the shaft against which it bears. In the drawings such pressure mechanism is represented as a bent lever E, a connecting rod F, and a treadle or lever G, the bent lever E, being supported on a fulcrum or pin $f$. The lower arm of the lever E, is brought to bear against either the end of the shaft $d$, or a suitable stop or bearing placed between it and the end of the shaft.

The grippers or holders as in other machines of this character consist of two circular disks or plates one of which, (viz, B) should be provided with a very thin edge and made tapering from such edge down to its shaft as seen at $g$, $g$. The other gripper (C) is provided with a cylindric periphery of a greater breadth than that of the gripper B, such breadth being sufficient to constitute a fair and proper surface for the plate to rest on when bent down upon it by the action of the binding roller to be hereinafter described.

H, and I, are the rotary cutters, their planes of rotation being arranged at an obtuse angle with one another, instead of at right angles. The plane of rotation of the cutter I, is perpendicular to that of the tin plate placed between the holders B, C. Consequently, the plane of rotation of the cutter H, is brought to an acute angle with the plane of rotation of the holder B. Such an arrangement of the cutters and holders, allows the cutter H when carried close up toward or against the holder B, to overlap it, and so as to carry the acting cutting edges of the cutters nearer to the peripheries of the holders than they could be were the planes of rotation of the cutters arranged at right angles to one another.

The two cutters are supported on a movable or sliding carriage K, K', which slides on parallel ways L, L, L', L', and is capable of being moved thereon either toward or away from the holders, and confined in any convenient manner by sets of screws or clamping contrivances properly affixed to the carriage and frame A. To such carriage a slide rod M, carrying a friction roller N, is adapted, in such manner as to enable it to be moved either toward or away from an oval pattern or curved plate O, fixed on the shaft of the holder B. The carriage K, K', should have a clamping screw or contrivance P, adapted to it, in such manner as to enable a workman or attendant to clamp the slide bar or rod M, in any position in which it may be placed and in accordance with the size of the ellipse or shape to be cut from the sheet of tin. Besides the arm and roller, a weight Q, or other analogous contrivance is employed at one or both ends of the cutter carriage to keep the roller of the arm close against the pattern plate O, during the operation of cutting the tin. Such weight is suspended to a cord or chain $i$, which passes over a guide pulley $k$, and is attached to the cutter carriage. The periphery of the pattern plate may be of a form similar to that of the tin to be cut, it being understood that it may be of any regular or irregular figure except a circle, and when any such figure except a circle is to be cut, the cutter carriage is not to be clamped down upon the frame, but should be suffered to move freely in its ways, and to be moved either by the action of the pattern plate, or the counteraction of the weight.

R is the bending roller its object being to bend a circular annulas of a circular plate down at an angle to the concentric circle inclosed by it, or in other words to turn a lip on the circle in order to convert it into a box cover or such like article. This roller rotates freely on the inner end of a sliding shaft $s$, arranged as seen in the drawings. The roller is composed of a cylindric roller $m$, and a cone, or approximately conic roller or projection $n$. The sliding shaft $s$, is supported by a frame or carriage T, and is moved either toward or away from the holders, by means of a lever $v$, or other suitable contrivance, properly adapted to the carriage T. Such carriage T, should be so fixed to the frame A as to be capable of being elevated and fastened in any required position in accordance with the diameter of the holder on whose periphery the lip of the circular plate is to be formed. For this purpose the carriage slides on two vertical rods or bars $o$, $o$, and has set screws $p$, $p$, extended through it, and against the said bars.

From the lower side of the frame A, a rod $q$ extends vertically downward, and has a slide rest $r$, adapted to it so as to be capable of being slid or moved freely on it, and fixed in any desirable position thereon by a set screw $s$. This rest supports the journal of a gage V which journal is set at an inclination to the horizontal plane, such as will bring the gage into the inclined position as seen in Fig. 3. The gage turns on the journal, and has a weighted arm $t$, extended from it as seen in the drawing. When the tin plate is placed between the holders B, C, its lower edge is brought to rest on the upper part of the gage V, while its inner edge is brought against the vertex of the angle of the two cutting edges of the cutters. This having been accomplished, the workman bears down the treadle lever, so as to cause the holders B, C, to firmly grasp the tin plate between them. He next and while the plate is so held, applies his hand to the crank, and rotates the shafts of the holders, and the holders and plates in the direction denoted by the arrow $x$, in Fig. 2. Such portions of the plate as project beyond the periphery or boundary of its reduction, will bear against the gage, and move said gage on its journal, until they are separated from the plate, which being accomplished the weighted arm $t$ (which arm and weight is heavier than the gage) in consequence of the action of gravity will move the gage back to its original position, or one in which the distance of the top or upper part of the gage from the center of the holders shall be equal to the radius of the circle cut by the cutters.

In order that a plate of tin may be extended between the cutters so as to enable them to cut a circular or other shaped orifice in it the axle $y$ of the smaller cutter H is made to rest against a pin or wedge 2, which passes down through the bearing $w$ of the axle, the same being exhibited in Fig. 4, which is a vertical section of said parts. After the tin plate has been introduced between the rollers and holders, the latter are next made to firmly grasp it, and the wedge pin is placed downward so as to impel the cutter H forward, and into and through the plate. On rotating the holders the plate will be rotated and the cutters made to cut out the orifice required.

Having thus described my improved machine, what I claim as of my invention therein is as follows:

1. I claim the improvement in the bending mechanism, the same consisting in the combination of the conic or approximately conic roller or projection $n$ with the cylindric part or roller $m$ and with the circular disks or holders in the manner as above described, and so as when pressed against the tin to gradually bend it over and down upon the disk or holder $c$ so as to enable the roller $m$ to pass over and upon the tin and complete the bending of it down upon the periphery of the holder.

2. I also claim the improvement in the construction of the gage V, whereby it is adapted to operate when the tin plate is rotated in a vertical plane, such improvement consisting in arranging its supporting journal at an inclination to the horizontal plane, and applying a weighted arm, or its mechanical equivalent to the gage as seen in the drawings or so that the gravitating power of the weighted arm shall restore the gage to its original and proper position under the holders, after it has been freed from the pressure of the surplus tin or part removed by the cutters.

In testimony whereof I have hereto set my signature this 2d day of November, A. D. 1850.

JOSEPH F. FLANDERS.

Witnesses:
R. H. EDDY,
FRANCIS GOULD.